US010148838B2

(12) United States Patent
Hashimoto

(10) Patent No.: US 10,148,838 B2
(45) Date of Patent: Dec. 4, 2018

(54) IMAGE FORMING APPARATUS, STARTUP METHOD, AND NON-TRANSITORY RECORDING MEDIUM FOR STORING COMPUTER READABLE PROGRAM

(71) Applicant: KONICA MINOLTA, INC., Chiyoda-ku, Tokyo (JP)

(72) Inventor: Hirofumi Hashimoto, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/640,889

(22) Filed: Jul. 3, 2017

(65) Prior Publication Data

US 2018/0013910 A1    Jan. 11, 2018

(30) Foreign Application Priority Data

Jul. 5, 2016  (JP) .................................. 2016-133595

(51) Int. Cl.
*H04N 1/00*   (2006.01)
(52) U.S. Cl.
CPC ..... *H04N 1/00891* (2013.01); *H04N 1/00411* (2013.01); *H04N 2201/0094* (2013.01)
(58) Field of Classification Search
USPC ....................................................... 358/1.14
See application file for complete search history.

(56) References Cited

U.S. PATENT DOCUMENTS

| 2012/0320402 | A1* | 12/2012 | Okuzono | ........... G03G 15/5004 |
| | | | | 358/1.14 |
| 2013/0282957 | A1* | 10/2013 | Mylly | ................. G06F 12/0223 |
| | | | | 711/103 |
| 2017/0176917 | A1* | 6/2017 | Ito | .......................... G03G 15/80 |
| 2017/0176920 | A1 | 6/2017 | Okuzono et al. | |
| 2017/0180582 | A1* | 6/2017 | Kodama | ............ H04N 1/00891 |

FOREIGN PATENT DOCUMENTS

| JP | 10-026911 A | 1/1998 |
| JP | 2013-020606 A | 1/2013 |

* cited by examiner

*Primary Examiner* — Ngon Nguyen
(74) *Attorney, Agent, or Firm* — Buchanan Ingersoll & Rooney PC

(57) ABSTRACT

An image forming apparatus includes a non-volatile memory and a processor. The processor obtains first data stored in the non-volatile memory at a predetermined point in time from when startup of a system starts to when the startup finishes before a shut-off command is given. The processor determines progress of predetermined processing in response to a connection command to turn on the power given during the time. When the progress exceeds a predetermined standard, the processor starts continues obtaining second data which is greater than the first data and is stored in the non-volatile memory at a point in time when the startup finishes. After the system finishes, if obtaining the second data is finished, the processor starts up the system by using the second data. Otherwise, the processor starts up the system by using the first data.

15 Claims, 14 Drawing Sheets

| SNAPSHOT SIZE | SAVED DATA SIZE (MB) | | | | | | | | | | | | | | | | | | | | | | | | |
|---|---|---|---|---|---|---|---|---|---|---|---|---|---|---|---|---|---|---|---|---|---|---|---|---|---|
| | 0 | ... | 150 | 180 | 210 | 240 | 270 | 300 | 330 | 360 | 390 | 420 | 450 | 480 | ... | 630 | 660 | 690 | 720 | 750 | 780 | 810 | 840 | 870 | 900 | 930 |
| 680 | 1 | ... | 1 | 1 | 0 | 0 | 0 | 0 | 0 | 0 | 0 | 0 | 0 | 0 | ... | 0 | 0 | / | / | / | / | / | / | / | / | / |
| 710 | 1 | ... | 1 | 1 | 1 | 0 | 0 | 0 | 0 | 0 | 0 | 0 | 0 | 0 | ... | 0 | 0 | 0 | / | / | / | / | / | / | / | / |
| 740 | 1 | ... | 1 | 1 | 1 | 1 | 0 | 0 | 0 | 0 | 0 | 0 | 0 | 0 | ... | 0 | 0 | 0 | 0 | / | / | / | / | / | / | / |
| 770 | 1 | ... | 1 | 1 | 1 | 1 | 1 | 0 | 0 | 0 | 0 | 0 | 0 | 0 | ... | 0 | 0 | 0 | 0 | 0 | / | / | / | / | / | / |
| 800 | 1 | ... | 1 | 1 | 1 | 1 | 1 | 1 | 0 | 0 | 0 | 0 | 0 | 0 | ... | 0 | 0 | 0 | 0 | 0 | 0 | / | / | / | / | / |
| 830 | 1 | ... | 1 | 1 | 1 | 1 | 1 | 1 | 1 | 0 | 0 | 0 | 0 | 0 | ... | 0 | 0 | 0 | 0 | 0 | 0 | 0 | / | / | / | / |
| 860 | 1 | ... | 1 | 1 | 1 | 1 | 1 | 1 | 1 | 1 | 0 | 0 | 0 | 0 | ... | 0 | 0 | 0 | 0 | 0 | 0 | 0 | 0 | / | / | / |
| 890 | 1 | ... | 1 | 1 | 1 | 1 | 1 | 1 | 1 | 1 | 1 | 0 | 0 | 0 | ... | 0 | 0 | 0 | 0 | 0 | 0 | 0 | 0 | 0 | / | / |
| 920 | 1 | ... | 1 | 1 | 1 | 1 | 1 | 1 | 1 | 1 | 1 | 1 | 0 | 0 | ... | 0 | 0 | 0 | 0 | 0 | 0 | 0 | 0 | 0 | 0 | / |

6B1

6D21, 6D22, 6D23, 6D24, 6D25, 6D26, 6D27, 6D28, 6D29

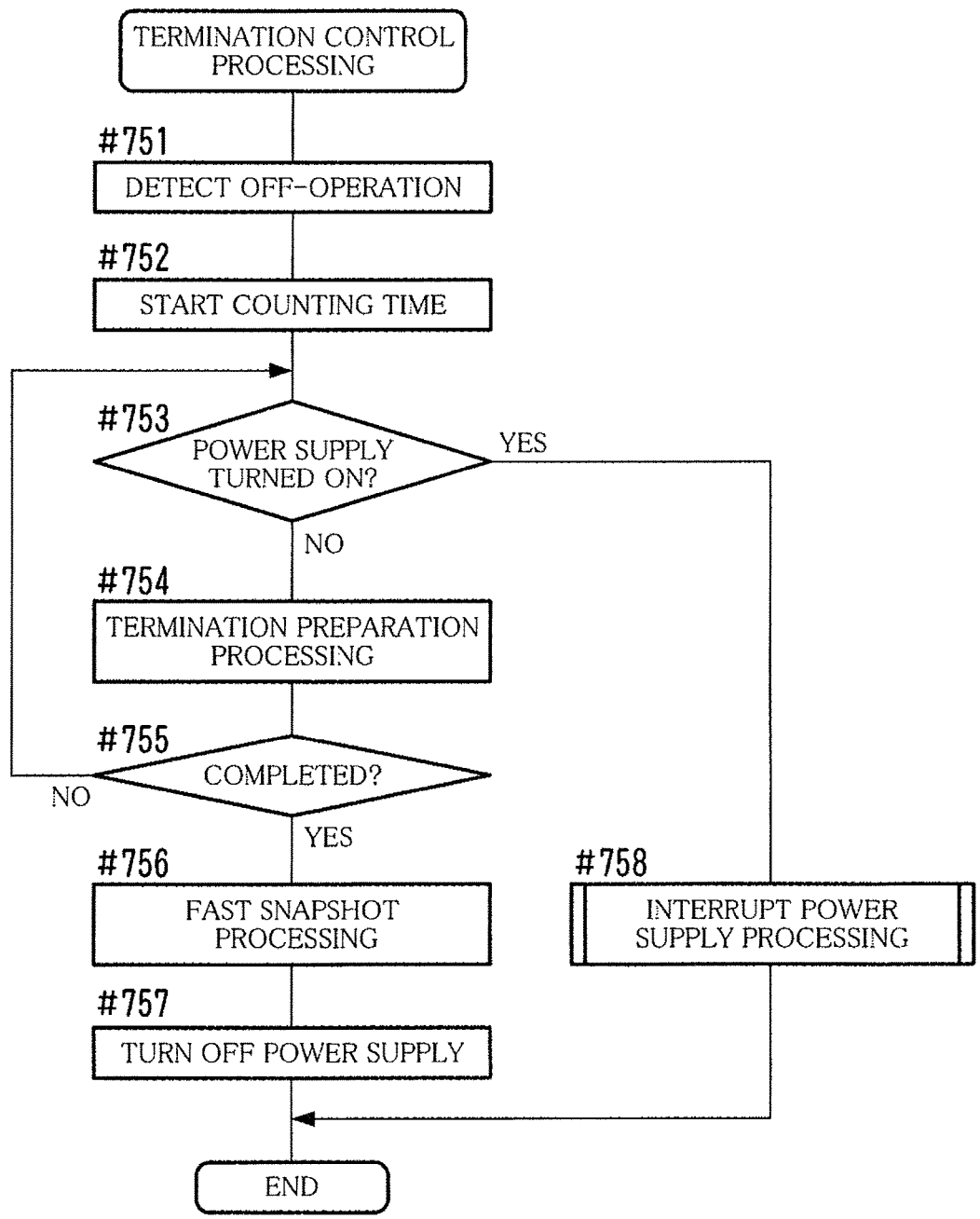

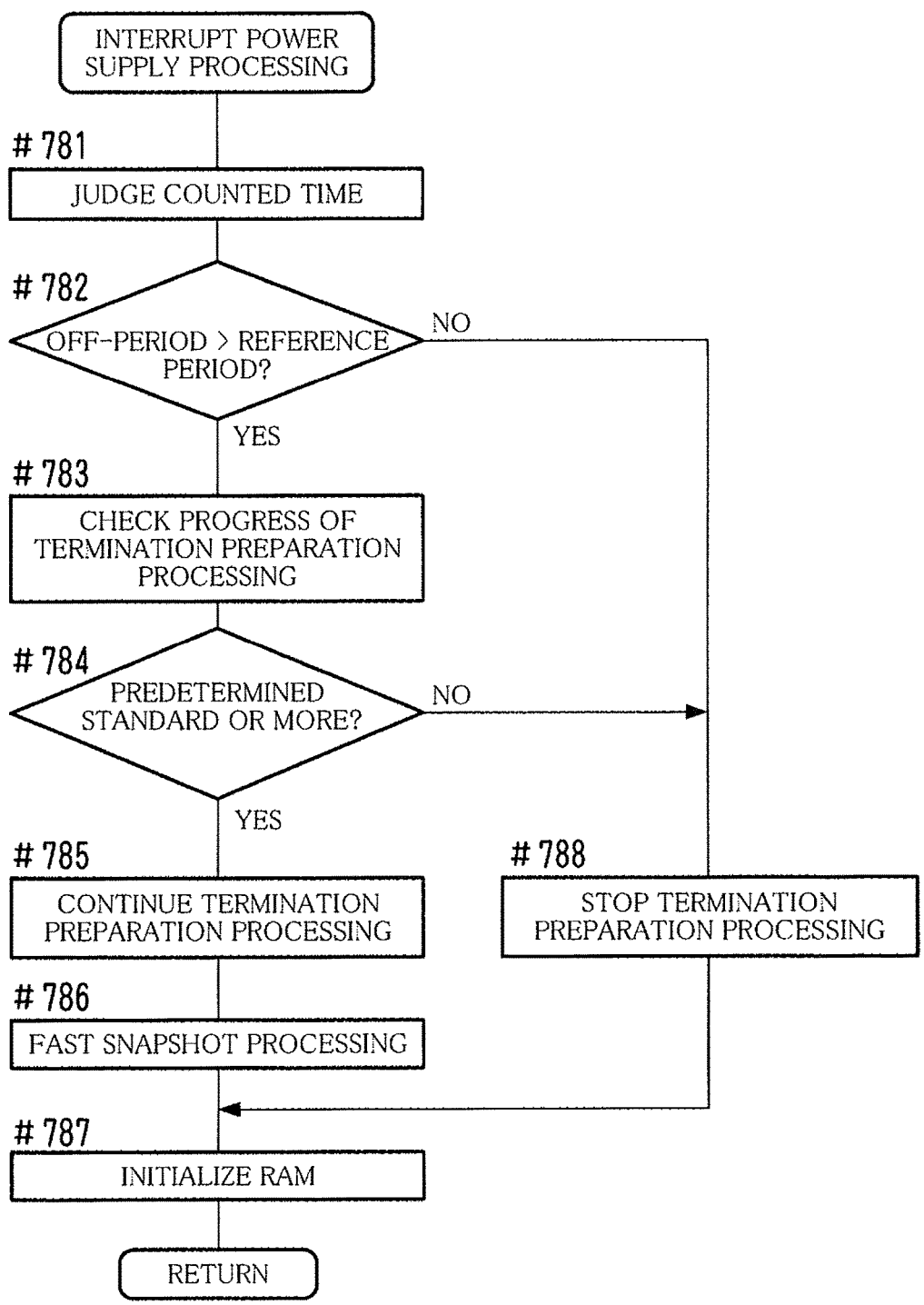

IMAGE FORMING APPARATUS, STARTUP METHOD, AND NON-TRANSITORY RECORDING MEDIUM FOR STORING COMPUTER READABLE PROGRAM

Japanese Patent application No. 2016-133595 filed on Jul. 5, 2016, including description, claims, drawings, and abstract of the entire disclosure is incorporated herein by reference in its entirety.

BACKGROUND

1. Technological Field

The present invention relates to a technique for reducing the startup time of a system of an image forming apparatus.

2. Description of the Related Art

Conventional information devices such as personal computers perform, in response to user operation of turning off the power, a shutdown which is processing of stopping an Operating System (OS) from working before the power is turned off. During the shutdown, active data is written onto a disk or a change applied to the OS or an application is saved.

An image forming apparatus called a "multifunction device", a "Multi-Functional Peripheral (MFP)", or the like performs a similar shutdown before the power is turned off. Technologies related to a shutdown of an image forming apparatus include the technologies provided below.

According to an image forming apparatus described in Japanese Laid-open Patent Publication No. 2013-020606, the image forming apparatus stores, when off operation of a power switch is detected, a normal state of the image forming apparatus upon detection of the off operation; shifts, when on operation of the power switch is detected next, a state of the image forming apparatus to a suspend state from which the image forming apparatus can return to the normal state; starts measuring time upon shifting to the suspend state; acquires, when the on operation of the power switch is detected in the suspend state, a value of the time measured; and causes the image forming apparatus to restart or to return to the normal state depending on the value of the measured time acquired. Herein, the arrangement is feasible not only in the suspend state but also in a hibernation state. The hibernation state is a state in which the power consumption is reduced when a user temporarily stops using the computer, which is similar to the suspend function. The hibernation state, however, differs from the suspend function in the following respect. In the hibernation state, data stored in a memory is copied, as a file called a snapshot, to a non-volatile storage such as a hard disk and supplying power to the memory is stopped. Thereafter, the state before the temporary stop by the user can be restored based on the snapshot.

According to an image forming apparatus described in Japanese Laid-open Patent Publication No. 10-026911, the image forming apparatus includes a storage means for storing thereinto image formation conditions such as a paper size, a number of paper sheets, and image gradation; a timer means for measuring elapsed time since the image forming apparatus was turned off; a resume means for setting, when the power of the image forming apparatus is turned on, the image formation conditions stored in the storage means; and a control means for, when the image forming apparatus is turned on, activating the resume means where the time measured by the timer means does not reach predetermined time and for not activating the resume means where the time measured by the timer means reaches the predetermined time.

In the meantime, a user sometimes performs operation of turning off the image forming apparatus and immediately thereafter performs operation of turning it on. Such a case includes, for example, a case where the user finds something incomplete in a printed matter after turning off the power, and turns it on for printing again.

The image forming apparatus described in Japanese Laid-open Patent Publication No. 2013-020606 is capable of starting up from the suspend state or the hibernation state or restarting normally. The image forming apparatus described in Japanese Laid-open Patent Publication No. 10-026911 is capable of starting up with the resume means activated and starting up normally. The image forming apparatuses use the plurality of kinds of startup methods selectively to reduce, to some extent, the time necessary for startup. Shortening further the time necessary for startup would enable the user to start a printing task and other tasks earlier than is conventionally possible.

SUMMARY

The present invention has been achieved in light of such an issue, and therefore, an object of an embodiment of the present invention is to shorten, as compared to the conventional technologies, the time required for the startup of a system of an image forming apparatus when operation of turning off the power is performed and soon after operation of turning it on is performed.

To achieve at least one of the abovementioned objects, according to an aspect of the present invention, an image forming apparatus reflecting one aspect of the present invention includes a non-volatile memory; and a hardware processor that: executes a first obtaining process for obtaining first data before a shut-off command to turn off power is given, the first data being a predetermined part or a whole of data stored in the non-volatile memory at a predetermined point in time from when startup of a system starts to when the startup of the system finishes; executes a determination process for determining progress of predetermined processing in response to a connection command to turn on the power given during a period of time from when the shut-off command is given to when the system finishes; executes a second obtaining process for, when the progress exceeds a predetermined standard, starting obtaining or continue obtaining second data, and for, when the progress falls short of the predetermined standard, not starting obtaining or stop obtaining the second data, the second data being greater than the first data and being a predetermined part or a whole of data stored in the non-volatile memory at a point in time when the startup of the system finishes; and executes a startup process for, when the second obtaining process finishes obtaining the second data after the system finishes, starting up the system by using the second data, and to, when the second obtaining process fails to finish obtaining the second data after the system finishes, starting up the system by using the first data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 1 is a diagram showing an example of the hardware configuration of an image forming apparatus.

FIG. 6 is a diagram showing an example of a result of determination whether or not fast snapshot processing is continued or stopped for each combination of size of the entire fast snapshot data and size of saved data.

FIG. 13 is a flowchart depicting an example of the flow of termination control processing.

FIG. 14 is a flowchart depicting an example of the flow of interrupt power supply processing.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
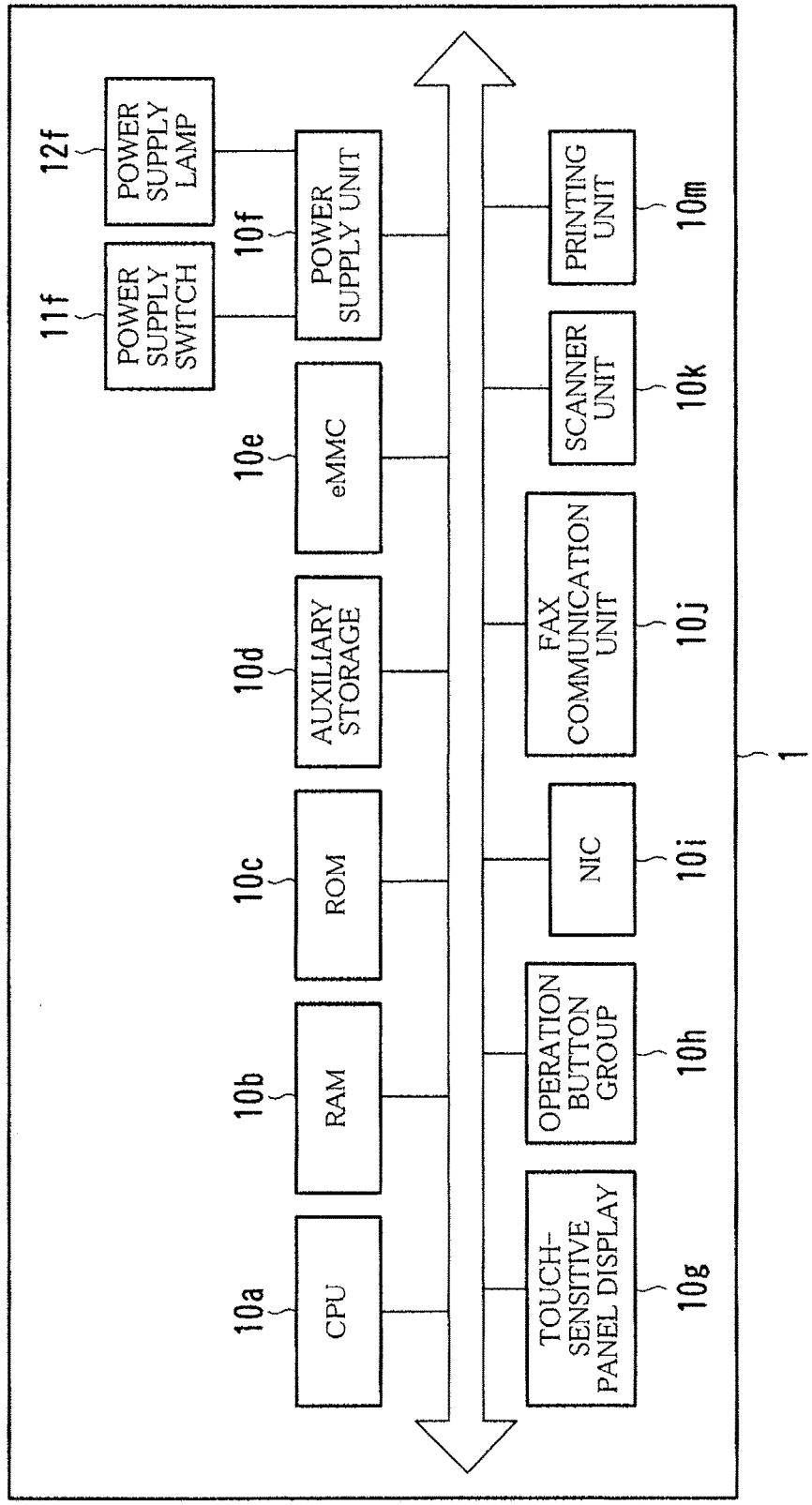

FIG. 1 is a diagram showing an example of the hardware configuration of an image forming apparatus 1.

The image forming apparatus 1 is an apparatus into which functions such as copying, PC printing, faxing, scanning, and box function are incorporated. The image forming apparatus 1 is generally called a "multifunction device" or a "Multi-Functional Peripheral (MFP)".

The PC printing function is to print an image onto paper based on image data received from a personal computer and so on connected to the image forming apparatus 1 for communication. The PC printing function is sometimes called a "network printing function" or "network printer function".

According to the box function, each user is given a storage area called a "box" or a "personal box". The box function enables each user to save image data and so on to his/her storage area and to manage the image data therein. Such boxes may be provided on a group-by-group basis and be shared by group members. The box corresponds to a "folder" or a "directory" in a personal computer.

Referring to FIG. 1, the image forming apparatus 1 is configured of hardware modules such as a Central Processing Unit (CPU) 10a, a Random Access Memory (RAM) 10b, a Read Only Memory (ROM) 10c, an auxiliary storage 10d, an embedded MultiMediaCard (eMMC) 10e, a power supply unit 10f, a power supply switch 11f, a power supply lamp 12f, a touch-sensitive panel display 10g, an operation button group 10h, a Network Interface Card (NIC) 10i, a fax communication unit 10j, a scanner unit 10k, and a printing unit 10m.

The eMMC 10e is an embedded external storage. Since the eMMC 10e is a non-volatile storage medium, information stored therein still remains even when the supply of electric power to the image forming apparatus 1 stops.

The power supply unit 10f is connected to a commercial power supply. The power supply unit 10f supplies electric power to the hardware modules of the image forming apparatus 1 in response to user operation on the power supply switch 11f described later or to a command given from the CPU 10a.

The power supply switch 11f receives user operation of turning on the power of the image forming apparatus 1 and user operation of turning off the power of the image forming apparatus 1. Hereinafter, the operation of turning on the power performed on the power supply switch 11f and the operation of turning off the power performed on the power supply switch 11f are referred to as "ON-operation" and "OFF-operation", respectively.

The power supply lamp 12f serves to show a state of "ON/OFF" of the power of the image forming apparatus 1. The power supply lamp 12f is lit when the power of the image forming apparatus 1 is turned on. The power supply lamp 12f goes out when the power of the image forming apparatus 1 is turned off.

The touch-sensitive panel display 10g displays, for example, a screen for presenting messages to a user, a screen for allowing the user to input commands or information, a screen for showing the results of processing executed by the CPU 10a. The touch-sensitive panel display 10g sends a signal indicating a touched location to the CPU 10a.

The operation button group 10h is a so-called hardware keyboard. The operation button group 10h has numeric keys, a start key, a stop key, and a function key.

The NIC 10i performs communication with a personal computer or a tablet computer in accordance with a protocol such as Transmission Control Protocol/Internet Protocol (TCP/IP).

The fax communication unit 10j sends and receives image data with a facsimile terminal in accordance with a protocol such as G3.

The scanner unit 10k optically reads an image on a sheet of paper placed on a platen glass to generate image data thereof.

The printing unit 10m prints, onto paper, an image captured by the scanner unit 10k and an image received by the NIC 10i or the fax communication unit 10j from another device.

Figure 2:
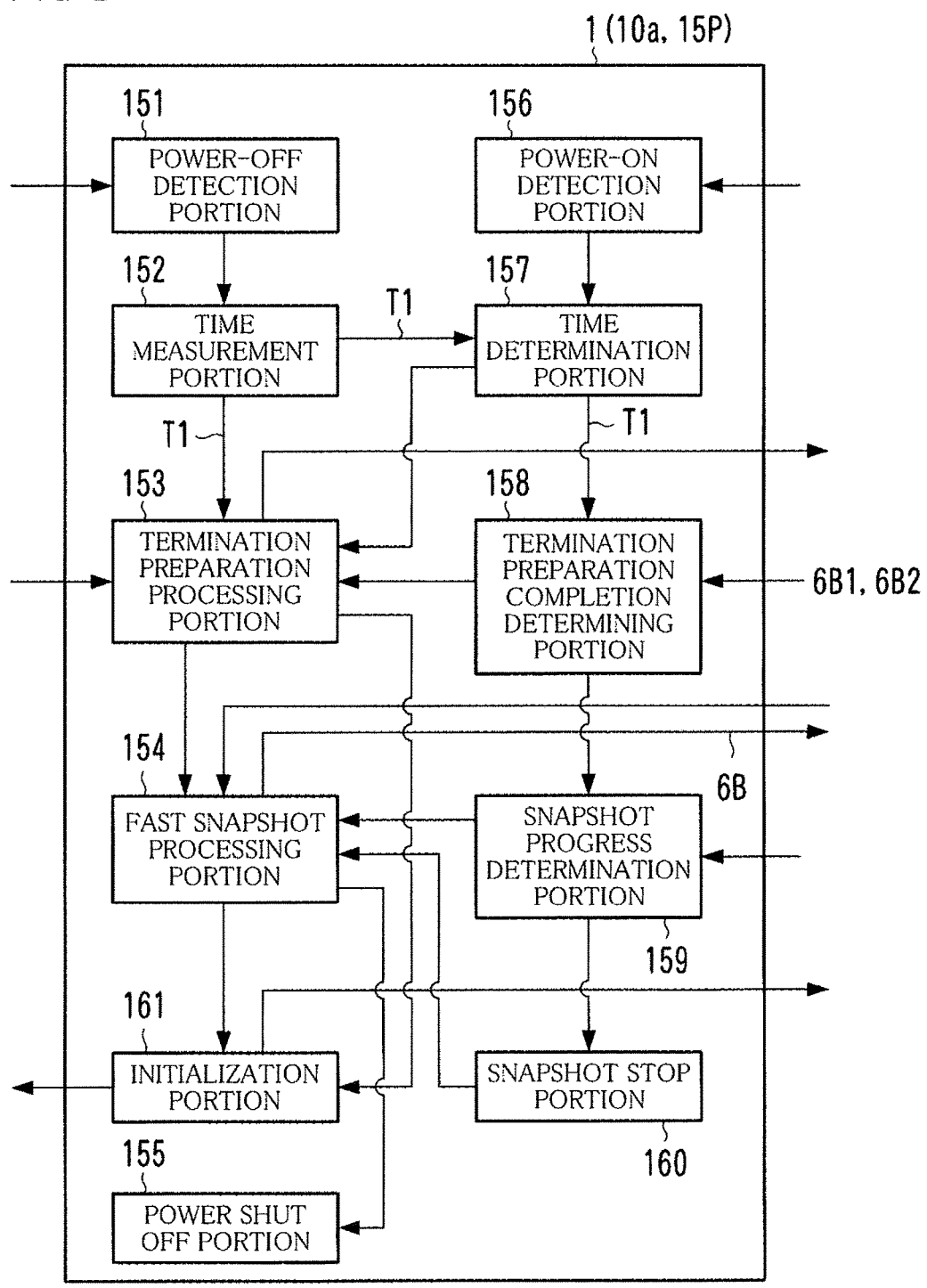
FIG. 2 is a diagram showing an example of the functional configuration of an image forming apparatus at the termination thereof.

The ROM 10c or the auxiliary storage 10d stores, therein, a program for implementing the foregoing functions such as copying function. The ROM 10c or the auxiliary storage 10d also stores, therein, a startup control program 10P (FIG. 7) and a termination control program 15P (FIG. 2).

The startup control program 10P is to start up an Operating System (OS) of the image forming apparatus 1. The "startup" is usually called "boot" in some cases.

The termination control program 15P is to terminate the OS of the image forming apparatus 1. The use of the termination control program 15P shortens the time required for the image forming apparatus 1 to start up as compared with conventional technologies.

The programs are loaded into the RAM 10b as necessary, and are executed by the CPU 10a. The auxiliary storage 10d is, for example, a hard disk drive or a Solid State Drive (SSD).

[Processing by Each Portion at the Termination of the Image Forming Apparatus 1]

Figure 3:
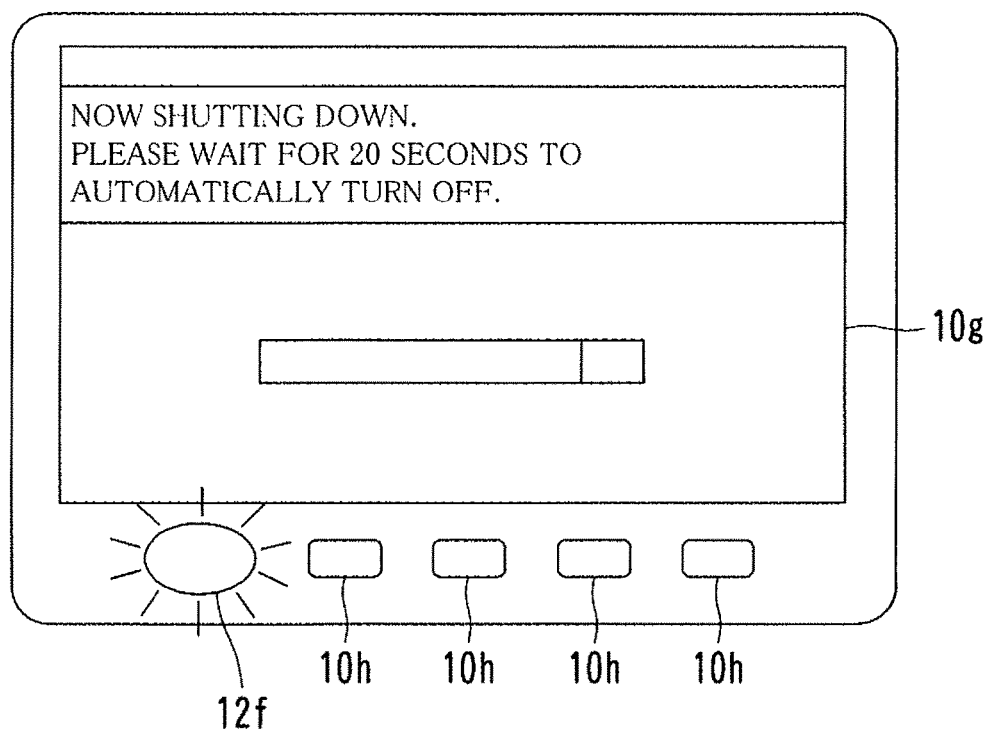
FIG. 3 is a diagram showing an example of a state of a touch-sensitive panel display and a power supply lamp while termination preparation processing is performed.
Figure 4:
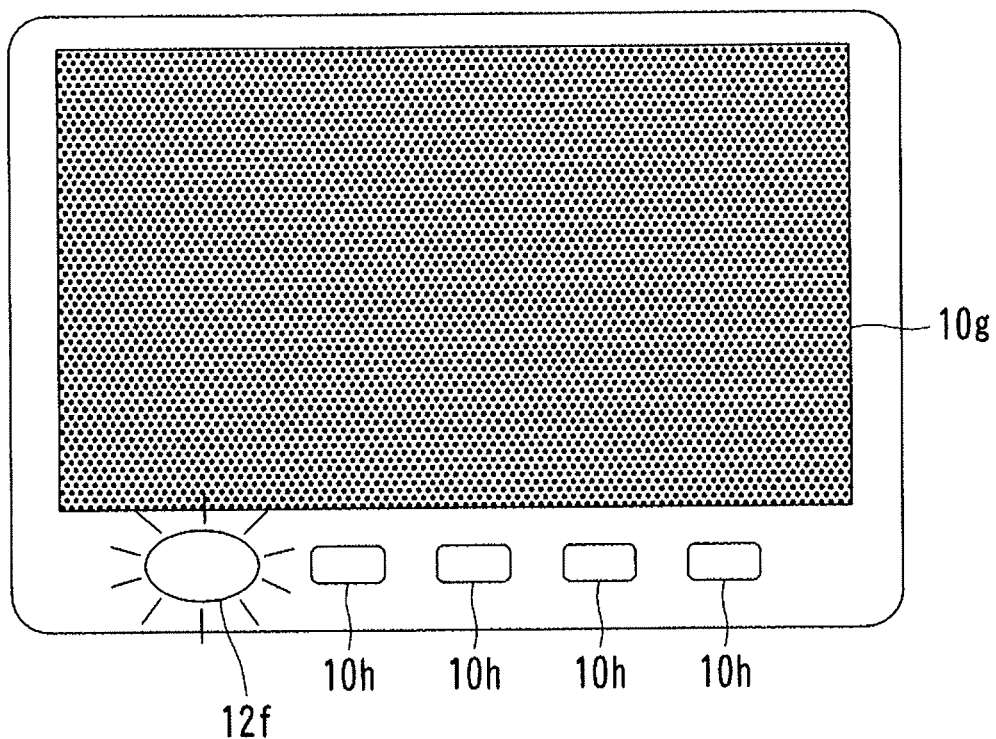
FIG. 4 is a diagram showing an example of a state of a touch-sensitive panel display and a power supply lamp while fast snapshot processing is performed.
Figure 5:
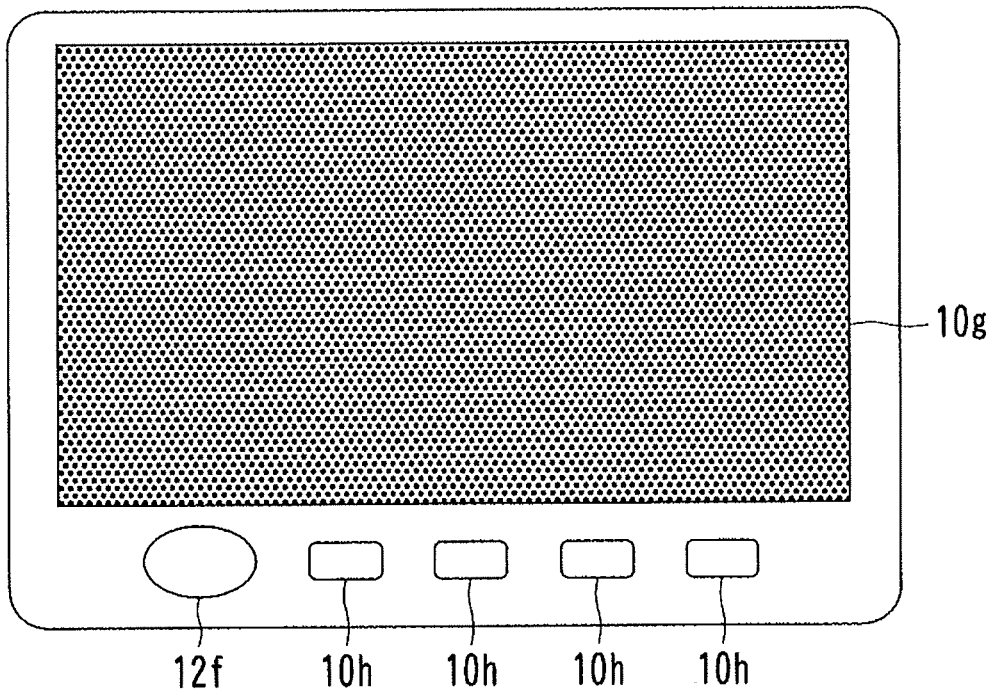
FIG. 5 is a diagram showing an example of a state of a touch-sensitive panel display and a power supply lamp after the power is turned off.

FIG. 2 is a diagram showing an example of the functional configuration of the image forming apparatus 1 at the termination thereof. FIG. 3 is a diagram showing an example of a state of the touch-sensitive panel display 10g and the power supply lamp 12f while termination preparation processing is performed. FIG. 4 is a diagram showing an example of a state of the touch-sensitive panel display 10g and the power supply lamp 12f while fast snapshot processing is performed. FIG. 5 is a diagram showing an example of a state of the touch-sensitive panel display 10g and the power supply lamp 12f after the power is turned off. FIG. 6 is a diagram showing an example of a result of determination whether or not the fast snapshot processing is continued or stopped for each combination of size of the entire fast snapshot data 6B and saved data size 6B1.

The termination control program 15P implements, in the image forming apparatus 1, the functions of a power-off detection portion 151, a time measurement portion 152, a termination preparation processing portion 153, a fast snapshot processing portion 154, a power shut off portion 155, a power-on detection portion 156, a time determination portion 157, a termination preparation completion determining portion 158, a snapshot progress determination portion 159, a snapshot stop portion 160, an initialization portion 161, and so on, all of which are shown in FIG. 2. Hereinafter, the processing by the individual portions at the termination of the image forming apparatus 1 is described with reference to FIGS. 2-6.

Where the user performs the OFF-operation while the OS of the image forming apparatus 1 works, the individual portions of the image forming apparatus 1 operate in the following manner.

The power-off detection portion 151 detects the OFF-operation. The power supply is not turned off immediately after the detection. Stated differently, the supply of electric power does not stop immediately. The power supply is turned off by the power shut off portion 155 detailed later when the termination preparation processing and the fast snapshot processing, described later, are completed.

The time measurement portion 152 starts time measurement when the power-off detection portion 151 detects the OFF-operation. The time measurement portion 152 keeps on counting the time until the power-on detection portion 156, detailed later, detects the ON-operation while the OS works. In short, the time measurement portion 152 measures a period of time from when the OFF-operation is performed to when the ON-operation is performed. Hereinafter, such a period of time is referred to as an "off-period T1".

The termination preparation processing portion 153 prepares for the power shut-off of the hardware modules such as the fax communication unit 10j and the scanner unit 10k of the image forming apparatus 1. For example, the termination preparation processing portion 153 cancels a command to conduct printing which has not yet been executed, or terminates a specific application. The termination preparation processing portion 153 also changes data stored in the RAM 10b, e.g., data showing a state of each of the hardware modules and a driver of each of the hardware modules, to the content at the time of completion of the startup of the OS of the image forming apparatus 1. In short, the termination preparation processing portion 153 restores the content of the data of the RAM 10b. The foregoing processing is hereinafter referred to as the "termination preparation processing".

Referring to FIG. 3, while the termination preparation processing is performed, the touch-sensitive panel display 10g displays, thereon, a message indicating that the image forming apparatus 1 is currently performing shutdown processing (termination preparation processing) for terminating the OS thereof. Further, the power supply lamp 12f stays on.

The fast snapshot processing portion 154 puts together the sets of data of the RAM 10b restored as described above to save the resultant to the eMMC 10e as the fast snapshot data 6B. Hereinafter, the processing is referred to as the "fast snapshot processing". In order to complete the processing, a certain amount of time is necessary depending on a write speed to the eMMC 10e. The processing is sometimes stopped by the snapshot stop portion 160 detailed later.

Referring to FIG. 4, while the fast snapshot processing is performed, nothing is displayed on the touch-sensitive panel display 10g and the power supply lamp 12f is lit.

The fast snapshot data 6B is used when a startup portion 101, detailed later, starts up the OS of the image forming apparatus 1. In general, the startup of the OS of the image forming apparatus 1 involves performing various processing such as system initialization processing, driver startup processing, and driver initialization processing. However, the use of the fast snapshot data 6B makes it possible to restore, at once, the state of the RAM 10b at a time when the startup of the OS has been completed.

The power shut off portion 155 controls the power supply unit 10f to turn off the power of the image forming apparatus 1 after the completion of the fast snapshot processing. When the power is turned off, the data stored in the RAM 10b is deleted.

When the power is turned off, nothing is displayed on the touch-sensitive panel display 10g and the power supply lamp 12f goes out as shown in FIG. 5.

The power-on detection portion 156 detects the ON-operation while the OS of the image forming apparatus 1 works. When the ON-operation is detected, a restart mode is set in the image forming apparatus 1. In response to the restart mode set, processing for terminating the OS is completed, the data stored in the RAM 10b is deleted quickly, and then the restart of the OS starts.

When the power-on detection portion 156 detects the ON-operation, the time determination portion 157 determines whether or not the off-period T1 measured by the time measurement portion 152 is longer than a reference period T2.

Where the off-period T1 is excessively short, it is obvious that the termination preparation processing has not yet been completed. In such a case, the off-period T1 and the reference period T2 are compared with each other in order to omit a determination made by the termination preparation completion determining portion 158 and the snapshot progress determination portion 159, detailed later, to simplify the processing. The reference period T2 is a preset period. To be specific, the reference period T2 is shorter than a period S21 described later. The reference period T2 corresponds to, for example, approximately one-tenth of the period S21.

When the time determination portion 157 determines that the off-period T1 is longer than the reference period T2, the termination preparation completion determining portion 158 and the snapshot progress determination portion 159 perform the following processing.

The termination preparation completion determining portion 158 judges whether or not the termination preparation processing is completed. The snapshot progress determination portion 159 determines the progress of the fast snapshot processing at a time when the power-on detection portion 156 detects the ON-operation. To be more specific, the snapshot progress determination portion 159 determines the progress of the fast snapshot processing as described below by using the saved data size 6B1 which is a part of the fast snapshot data 6B already saved to the eMMC 10e, an unsaved data size 6B2 which is the residual part, and a predetermined size 6C which is a preset size.

If the saved data size 6B1 is larger than the predetermined size 6C, then the snapshot progress determination portion 159 determines that the progress of the fast snapshot processing is, at least, above a predetermined standard.

If the saved data size 6B1 is smaller than the predetermined size 6C, then the snapshot progress determination portion 159 determines that the progress of the fast snapshot processing is below the predetermined standard.

The predetermined size 6C is a size of data that can be saved to the eMMC 10e from the RAM 10b during the period S21. The period S21 corresponds to a period S2 for the case where the equation "period H1=period S" is satisfied. The period S2 is a period from when the OFF-operation is performed on the power supply switch 11f to when the ON-operation is performed thereon.

The period H is a period of time from when the OFF-operation is performed to when the startup of the OS using the fast snapshot data 6B is completed. The period H is expressed in the following equation.

$$H = H1 + H2 + H3 + H4 \qquad \text{Equation (1)}$$

The period H1 is the time necessary for the termination preparation processing to be completed. The period H2 is the time necessary for the fast snapshot processing to be completed. The period H3 is the time required from when the startup of a Basic Input/Output System (BIOS) starts to when the startup thereof finishes. The period H4 is the time required from when the startup of the OS based on the fast snapshot data 6B starts to when the startup thereof finishes.

The period S is a period of time from when the OFF-operation is performed to when the startup of the OS based on the standard snapshot data 6A, detailed later, is completed. The period S is expressed in the following equation.

$$S = S1 + S2 + S3 + S4 \qquad \text{Equation (2)}$$

The period S1 is the time necessary for the termination preparation processing to be completed. The period S2 is a period of time from when the user performs the OFF-operation to when the user performs the ON-operation. The period S2 is also regarded as the off-period T1. The period S3 is the time required from when the startup of the BIOS starts to when the startup thereof finishes. The period S4 is the time required from when the startup of the OS based on the standard snapshot data 6A starts to when the startup thereof finishes.

As discussed above, the period S21 is the period S2 from when the OFF-operation is performed to when the ON-operation is performed, and is also the time for the case where the period H is equal to the period S, namely, the equation "H=S" is satisfied.

The right side of Equation (1) and the right side of Equation (2) are substituted into "H=S", and S21 is substituted into S2. Then, the following equation is expressed.

$$H1 + H2 + H3 + H4 = S1 + S21 + S3 + S4 \qquad \text{Equation (3)}$$

The period S21 is calculated from Equation (3).

$$S21 = H1 + H2 + H3 + H4 - (S1 + S3 + S4) \qquad \text{Equation (4)}$$

The same is similarly applied to the termination preparation processing to be performed during a period from when the OFF-operation is performed to when the startup of the OS based on the fast snapshot data 6B is completed. The same is similarly applied to the termination preparation processing to be performed during a period from when the OFF-operation is performed to when the startup of the OS based on the standard snapshot data 6A is completed. The same is similarly applied to the startup of the BIOS. Thus, the period S1 is equal to the period H1, and the period S3 is equal to the period H3. The following equation is therefore satisfied.

$$S21 = H2 + H4 - S4 \qquad \text{Equation (5)}$$

The period H2 and the period H4 are determined according to the size of the fast snapshot data 6B. As described earlier, the fast snapshot data 6B is data which is kept in the RAM 10b at the time of the completion of the startup of the OS. The fast snapshot data 6B primarily indicates information on the hardware and software of the image forming apparatus 1. Since the hardware functions and software functions of the image forming apparatus 1 seldom change, the data thereof changes rarely. The period H2 and the period H4 are thus almost constant.

The period S4 is determined according to the size of the standard snapshot data 6A. As described later, the standard snapshot data 6A is data which is kept in the RAM 10b at a specific point in time between the start and the completion of the startup of the OS. As with the fast snapshot data 6B, the standard snapshot data 6A seldom changes, and the specific point in time changes rarely. The period S4 is thus almost constant.

It is assumed that the period H1 is two seconds, the period H2 is fifteen seconds, the period H3 is two seconds, the period H4 is seven seconds, and the period S4 is sixteen seconds. In such a case, if the period S2 is six seconds, then each of the period H and the period S is twenty six seconds. The six seconds correspond to the period S21.

When the period S2 is longer than the period S21 if only a little, for example, is two seconds longer than the period S21, then the period S is twenty eight seconds. Since the period H is twenty six seconds, the period S is longer than the period H. In short, the startup of the OS based on the fast snapshot data 6B is completed earlier than the startup of the OS based on the standard snapshot data 6A.

In contrast, when the period S2 is shorter than the period S21 if only a little, for example, is two seconds shorter than the period S21, then the period S is twenty four seconds. Since the period H is twenty six seconds, the period S is shorter than the period H. In short, the startup of the OS based on the standard snapshot data 6A is completed earlier than the startup of the OS based on the fast snapshot data 6B.

It is assumed that the fast snapshot data 6B of 10 MB is saved, per second, to the eMMC 10e from the RAM 10b, in other words, the write speed is 10 MB/sec. In such a case, the saved data size 6B1 which is a part of the fast snapshot data 6B to be saved during the period S21 is 60 MB based on the foregoing example. The size of the data saved during the period S21 corresponds to the predetermined size 6C.

When the period S2 is longer than the period S21 by two seconds, the saved data size 6B1 is 80 MB which is larger than the predetermined size 6C. When the period S2 is shorter than the period S21 by two seconds, the saved data size 6B1 is 40 MB which is smaller than the predetermined size 6C.

In light of the above, when the period S2 is longer than the period S21, stated differently, when the fast snapshot processing progresses so that the saved data size 6B1 exceeds the predetermined size 6C, the startup of the OS based on the fast snapshot data 6B is completed earlier than the startup of the OS based on the standard snapshot data 6A.

In contrast, when the period S2 is shorter than the period S21, stated differently, when the fast snapshot processing does not so progress that the saved data size 6B1 exceeds the predetermined size 6C, the startup of the OS based on the standard snapshot data 6A is completed earlier than the startup of the OS based on the fast snapshot data 6B.

The predetermined size 6C and the period S21 are preferably calculated based on the numerical values obtained as a result of the startup processing and the termination preparation processing of the image forming apparatus 1 performed before. Alternatively, before the installation of the image forming apparatus 1, the startup processing and the termination preparation processing are performed, and the predetermined size 6C and the period S21 are preferably calculated based on the numerical values obtained from the result of the processing. Yet alternatively, the predetermined size 6C and the period S21 are preferably calculated in response to change in the hardware or software. Yet alternatively, the predetermined size 6C and the period S21 are preferably calculated depending on the running state of the image forming apparatus 1 or the use period thereof.

Referring back to FIG. 2, when the snapshot progress determination portion 159 determines that the progress of the fast snapshot processing is below the predetermined standard, in other words, that the saved data size 6B1 is smaller than the predetermined size 6C, the snapshot stop portion 160 stops the fast snapshot processing because the startup of the OS based on the standard snapshot data 6A is completed earlier than the startup of the OS based on the fast snapshot data 6B. Otherwise, the fast snapshot processing is continued.

If the fast snapshot processing progresses to the predetermined standard exactly, then the fast snapshot processing may be continued or stopped.

The description goes on to an example where the fast snapshot processing is continued or stopped based on which size the entirety of the fast snapshot data 6B has, based on which size the saved data size 6B1 has, namely, based on which size the fast snapshot data 6B obtained before the ON-operation is performed has. The description is provided with reference to FIG. 6.

FIG. 6 shows fields 6D21, 6D22, 6D23, . . . , 6D29 for sizes 6D1 of the entirety of the fast snapshot data 6B (680 MB, 710 MB, 740 MB, . . . , and 920 MB) in such a manner that the sizes 6D1 correspond, one-by-one, to the fields.

Each of the fields indicates the result of determination as to whether the fast snapshot processing on the fast snapshot data 6B corresponding to each field is continued or stopped. The determination result is indicated for each of sizes (0 MB, 150 MB, 180 MB, 210 MB, . . . 930 MB) of the saved data size 6B1, namely, for each of sizes of the fast snapshot data 6B obtained before the ON-operation is performed.

For example, the field 6D21 indicates the result of determination as to whether the fast snapshot processing is continued or stopped for each size of the fast snapshot data 6B of 680 MB.

Cells of each of the saved data sizes 6B1 show any one of values of "1" and "0" in each of the fields.

The value "1" means that the fast snapshot processing is stopped. Stated differently, the value "1" also means that the saved data size 6B1 is below the predetermined size 6C. The value "0" means that the fast snapshot processing is continued. Stated differently, the value "0" also means that the saved data size 6B1 is above the predetermined size 6C. The fields with diagonal lines mean that the saved data size 6B1 exceeds the fast snapshot data 6B and thus the determination cannot be made.

For example, when the snapshot size 6D1, namely, the size of the fast snapshot data 6B is 800 MB, each of the saved data sizes 6B1 of 300 MB or smaller is "1" as shown in the field 6D25, and the fast snapshot processing is stopped. In short, each of the saved data sizes 6B1 is below the predetermined size 6C. Each of the saved data sizes 6B1 of 300 MB or larger is "zero 0", and the fast snapshot processing is continued. In short, each of the saved data sizes 6B1 exceeds the predetermined size 6C. The predetermined size 6C falls within a range of 300 MB to 330 MB.

Where the fast snapshot processing is stopped, the initialization portion 161 initializes the fast snapshot processing which has been performed before the stop. Stated differently, the initialization portion 161 deletes a part of the fast snapshot data 6B saved in the eMMC 10e therefrom. Thereby, the processing of terminating the OS is completed.

Thereafter, the RAM 10b and the like are initialized, and the startup of the BIOS of the image forming apparatus 1 is started. The same is similarly applied to the case where the time determination portion 157 determines that the off-period T1 is shorter than the reference period T2.

[Processing by Each Portion at the Startup of the Image Forming Apparatus 1]

Figure 7:
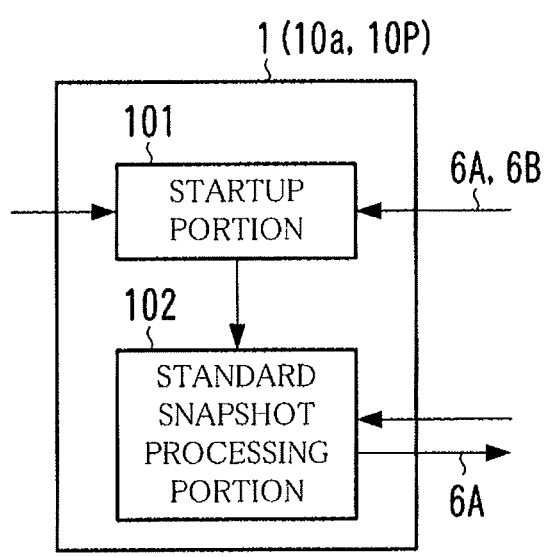
FIG. 7 is a diagram showing an example of the functional configuration of an image forming apparatus at the startup thereof.

FIG. 7 is a diagram showing an example of the functional configuration of the image forming apparatus 1 at the startup thereof.

The startup control program 10P implements, in the image forming apparatus 1, the startup portion 101 and a standard snapshot processing portion 102, both of which are shown in FIG. 7. The processing by the individual portions of the image forming apparatus 1 is described below with reference to FIG. 7.

Where the user performs the ON-operation with the power completely shut off, and, where the processing of terminating the OS with the restart mode set is completed, the image forming apparatus 1 operates in the following manner.

The BIOS starts up and the startup control program 10P is read out to the RAM 10b. The individual portions shown in FIG. 7 perform the processing based on the startup control program 10P.

Where the fast snapshot processing is completed, the startup portion 101 reads out the fast snapshot data 6B from the eMMC 10e to the RAM 10b. This changes the state of the RAM 10b to restore the state at a time when the startup of the OS has been completed, so that the processing of the startup of the OS is completed.

Where the standard snapshot data 6A, detailed later, rather than the fast snapshot data 6B is saved in the eMMC 10e, the startup portion 101 reads out the standard snapshot data 6A. This changes the state of the RAM 10b to restore the state at a specific stage of the startup of the OS. Stated differently, a part of the processing of the startup of the OS is completed. The remaining processing is performed as usual. In this way, the processing of the startup of the OS is completed.

The startup of the OS based on the standard snapshot data 6A needs more time than the startup of the OS based on the fast snapshot data 6B because the former includes normal startup processing as mentioned above.

Where neither the fast snapshot data 6B nor the standard snapshot data 6A is saved, the startup portion 101 starts up the OS normally by performing the initialization processing of the hardware or the programs, the startup processing of the driver, and other different processing.

The normal startup needs more time than the startup of the OS based on the fast snapshot data 6B and the startup of the OS based on the standard snapshot data 6A.

The standard snapshot processing portion 102 saves, as the standard snapshot data 6A, the data stored in the RAM 10b during the startup of the OS to the eMMC 10e. The processing is hereinafter referred to as "standard snapshot processing".

As with the fast snapshot data 6B, the standard snapshot data 6A is used when the startup portion 101 starts up the OS of the image forming apparatus 1. The standard snapshot data 6A is data which is stored in the RAM 10b at a specific point in time between the start and the completion of the startup of the OS. Thus, as discussed above, the use of the standard snapshot data 6A needs more time to start up the OS than the use of the fast snapshot data 6B. The specific point herein is preset time.

[Flow of Entire Processing]

Figure 8:
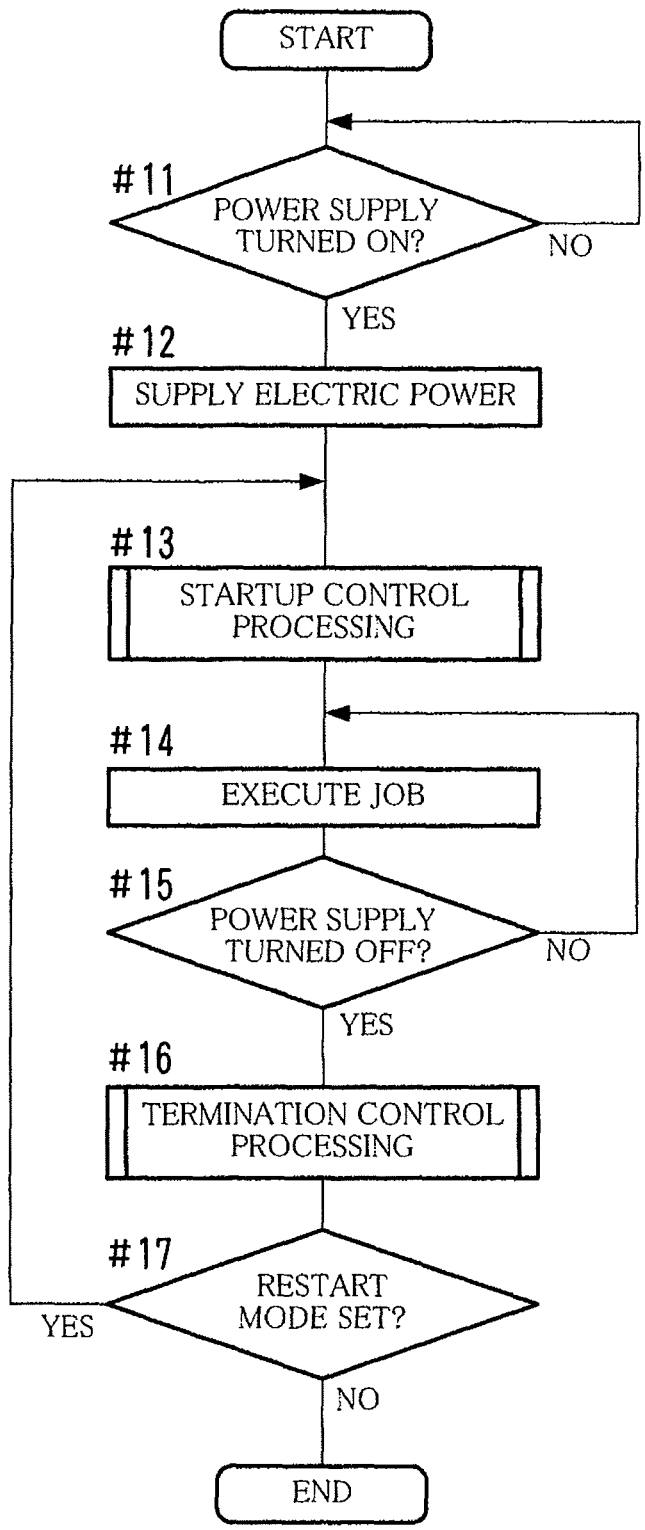
FIG. 8 is a flowchart depicting an example of the flow of the entire processing by an image forming apparatus.
Figure 9:
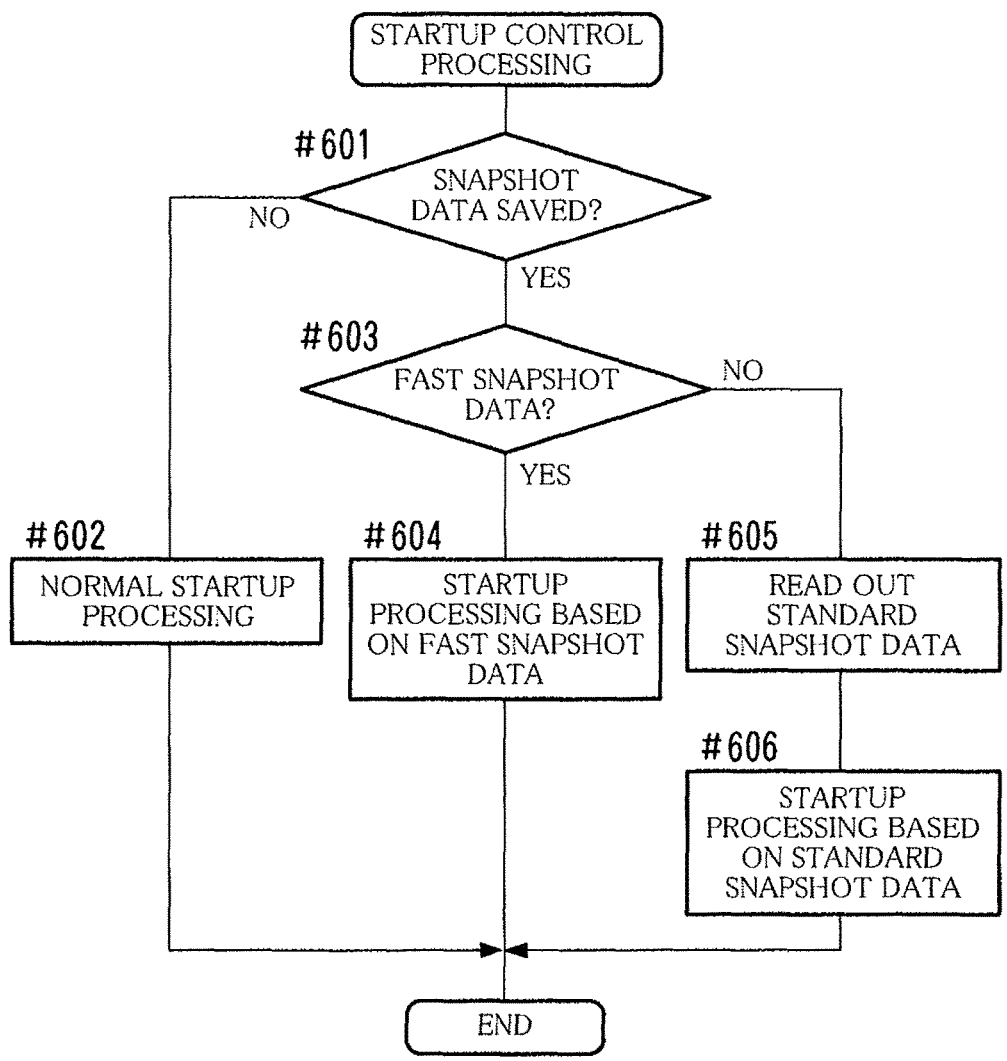
FIG. 9 is a flowchart depicting an example of the flow of startup control processing.
Figure 10:
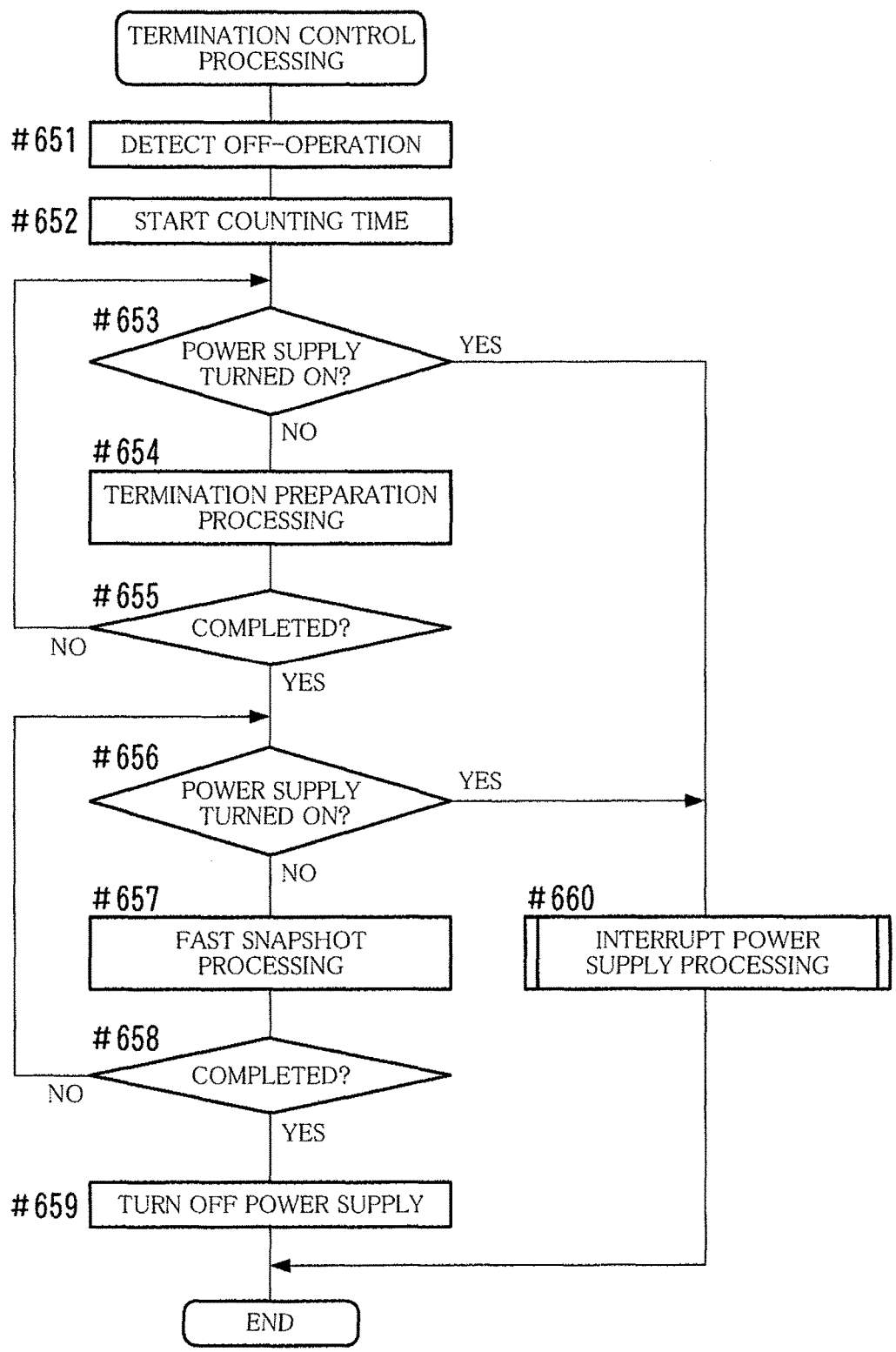
FIG. 10 is a flowchart depicting an example of the flow of termination control processing.
Figure 11:
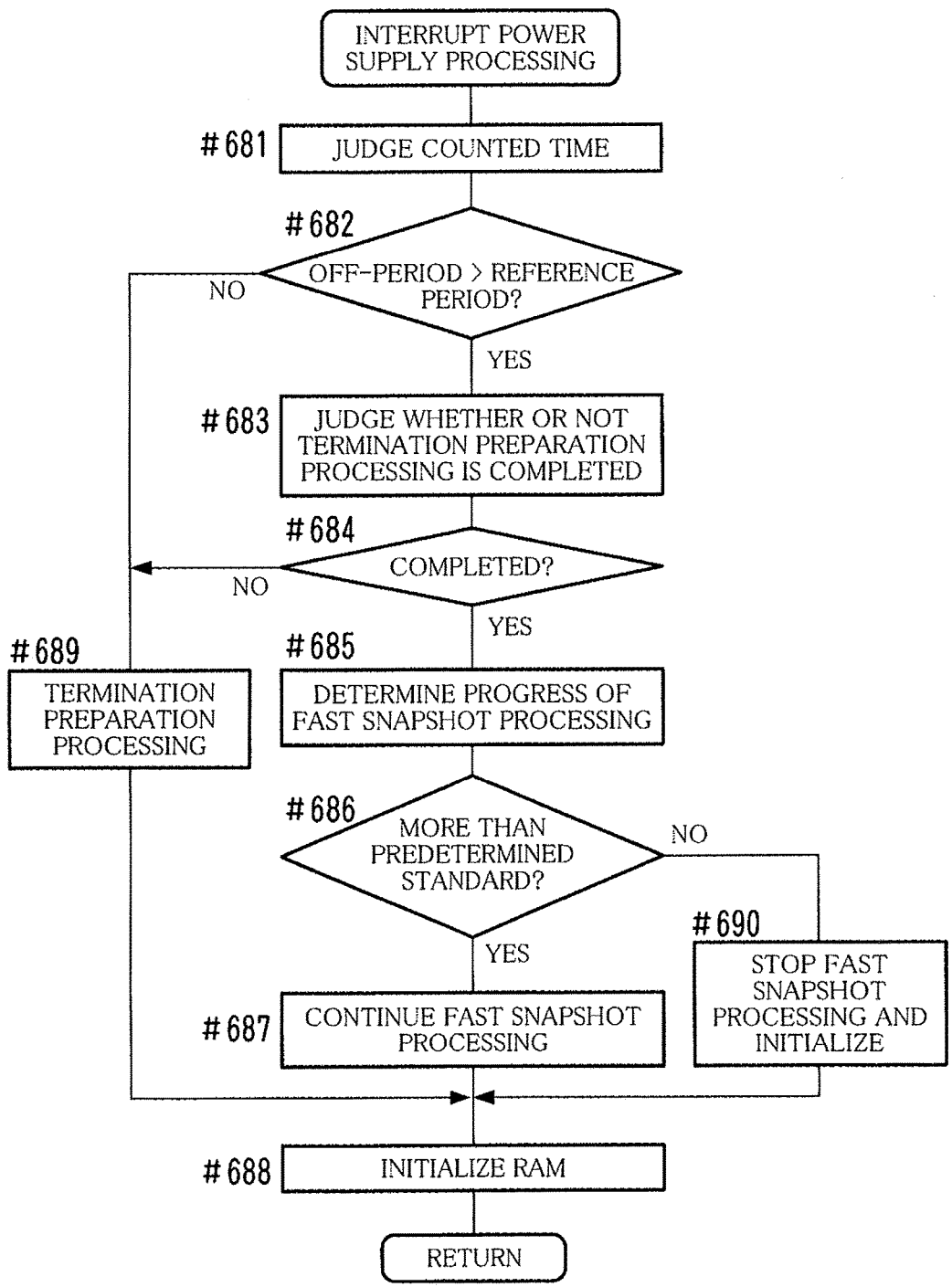
FIG. 11 is a flowchart depicting an example of the flow of interrupt power supply processing.

FIG. 8 is a flowchart depicting an example of the flow of the entire processing by the image forming apparatus 1. FIG. 9 is a flowchart depicting an example of the flow of startup control processing. FIG. 10 is a flowchart depicting an example of the flow of termination control processing. FIG. 11 is a flowchart depicting an example of the flow of interrupt power supply processing.

The description goes on to the flow of the entire processing by the image forming apparatus 1 with reference to the flowcharts of FIGS. 8-10.

The user turns on the power supply switch 11f (Step #11 of FIG. 8). In response to the user operation, the power supply unit 10f starts supplying electric power to the hardware modules (Step #12), the BIOS starts up, and the startup control program 10P is read out to the RAM 10b. The startup control processing shown in FIG. 9 is performed based on the startup control program 10P (Step #13).

If neither the fast snapshot data 6B nor the standard snapshot data 6A is saved in the eMMC 10e (NO in Step #601 of FIG. 9), then the startup portion 101 performs normal processing for starting up the OS from the beginning (Step #602).

If the fast snapshot data 6B is saved in the eMMC 10e (YES in Step #601 and Yes in Step #603), then the startup portion 101 starts up the OS by reading out the fast snapshot data 6B to the RAM 10b (Step #604).

If no fast snapshot data 6B is saved and the standard snapshot data 6A is saved (YES in Step #601 and NO in Step #603), then the startup portion 101 reads out the standard snapshot data 6A to the RAM 10b (Step #605). Thereby, the processing to a specific step of the startup of the OS is completed. Then, the remaining processing of the startup of the OS is performed (Step #606).

In Step #602 or Step #606, the standard snapshot processing portion 102 obtains, as the standard snapshot data 6A, the data stored in the RAM 10b at the specific step of the startup, and saves the obtained data to the eMMC 10e.

Referring back to FIG. 8, after the completion of the startup of the OS, the image forming apparatus 1 executes a job such as printing or fax transmission based on a command given by the user (Step #14).

When the user performs the OFF-operation (YES in Step #15), the image forming apparatus 1 performs the termination control processing depicted in FIG. 10 (Step #16).

The power-off detection portion 151 detects that the OFF-operation has been performed (Step #651 of FIG. 10). In response to the detection, the time measurement portion 152 starts counting the time of the off-period T1 (Step #652), and the termination preparation processing portion 153 starts the termination preparation processing (Step #654). The termination preparation processing is continued without being stopped unless the user performs the ON-operation (NO in Step #653).

The termination preparation processing is completed (YES in Step #655). When no ON-operation by the user is detected (NO in Step #656), the fast snapshot processing portion 154 starts the fast snapshot processing (Step #657). The fast snapshot processing is also continued without being stopped unless the user performs the ON-operation (NO in Step #656).

When the fast snapshot processing is completed with no ON-operation detected (YES in Step #658), the power shut off portion 155 turns off the power (Step #659).

When the power-on detection portion 156 detects the ON-operation by the user (YES in Step #653 or YES in Step #656) in the middle of the termination preparation processing or the fast snapshot processing, the interrupt power supply processing for stopping the fast snapshot processing is performed (Step #660) if necessary in the steps as shown in FIG. 11. At this time, the restart mode is set.

The time determination portion 157 judges whether or not the off-period T1 measured by the time measurement portion 152 is longer than the reference period T2 (Step #681 of FIG. 11). If the off-period T1 is longer than the reference period T2 (YES in Step #682), then the termination preparation completion determining portion 158 judges whether or not the termination preparation processing is completed (Step #683).

Where the termination preparation completion determining portion 158 determines that the termination preparation processing is completed (YES in Step #684), the snapshot progress determination portion 159 determines the progress of the fast snapshot processing (Step #685).

If the progress of the fast snapshot processing is above the predetermined standard (YES in Step #686), then the fast snapshot processing portion 154 continues the fast snapshot processing (Step #687). The initialization portion 161 then initializes the data stored in the RAM 10b (Step #688).

If the off-period T1 is shorter than the reference period T2 (NO in Step #682), or, alternatively, if the termination preparation processing has not yet been completed (NO in Step #684), then the termination preparation processing portion 153 continues the termination preparation processing (Step #689). However, where the termination preparation processing has not yet been started, the termination preparation processing is started.

If the progress of the fast snapshot processing is below the predetermined standard (NO in Step #686), then the snapshot stop portion 160 stops the fast snapshot processing and the initialization portion 161 initializes the content of the fast snapshot processing performed thus far (Step #690). The initialization portion 161 then initializes the data stored in the RAM 10b (Step #688). If the progress of the fast snapshot processing is equal to the predetermined standard, the fast snapshot processing may be continued or may be stopped.

Referring back to FIG. 8, where the image forming apparatus 1 is not placed in the restart mode (NO in Step #17), the image forming apparatus 1 is turned off.

In contrast, where the image forming apparatus 1 is placed in the restart mode (YES in Step #17), the startup control processing depicted in FIG. 9 is performed (Step #13).

Second Embodiment

The time required for the termination preparation processing is sometimes long depending on the number of hardware modules of the image forming apparatus 1 and the data of the RAM 10b. In such a case, the startup of the OS is sometimes completed by stopping the startup of the OS based on the fast snapshot data 6B in the middle of the termination preparation processing, not in the middle of the fast snapshot processing, and by performing the startup of the OS based on the standard snapshot data 6A.

In the second embodiment, an example is described of making a determination as to whether or not to perform the fast snapshot processing based on the progress of the termination preparation processing. Descriptions of parts that are identical with those in the first embodiment are omitted.

The hardware configuration of the image forming apparatus 1 is similar to that of the first embodiment, which is shown in FIG. 1. However, the ROM 10c or the auxiliary storage 10d stores, therein, a termination control program 16P (FIG. 12) instead of the termination control program 15P. The use of the termination control program 16P also shortens the time required for the image forming apparatus 1 to start up as compared with conventional technologies.

[Control on Each Portion at the Termination of the Image Forming Apparatus 1]

Figure 12:
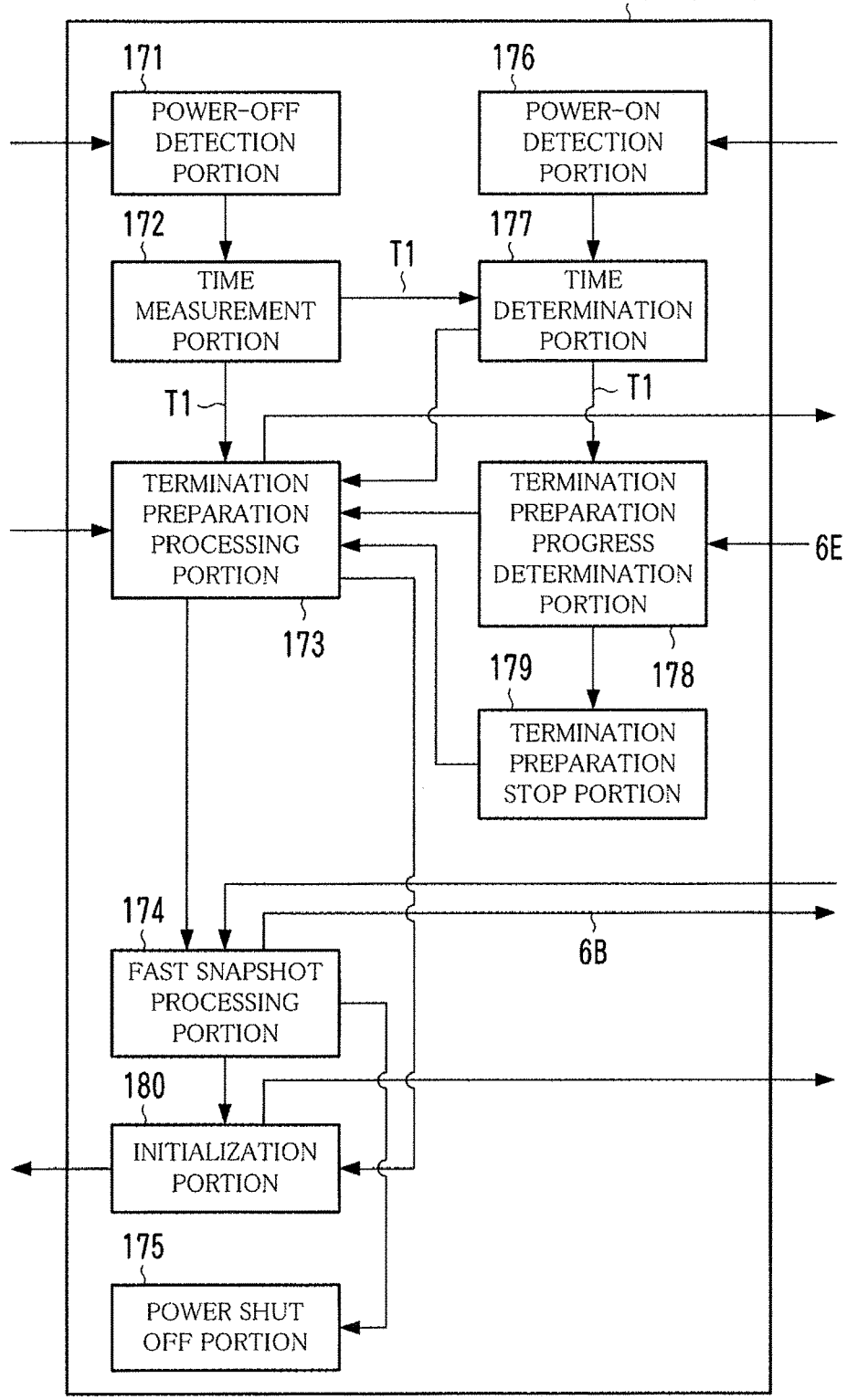
FIG. 12 is a diagram showing an example of the functional configuration of an image forming apparatus at the termination thereof.

FIG. 12 is a diagram showing an example of the functional configuration of the image forming apparatus 1 at the termination thereof.

The termination control program 16P implements, in the image forming apparatus 1, the functions of a power-off detection portion 171, a time measurement portion 172, a termination preparation processing portion 173, a fast snapshot processing portion 174, a power shut off portion 175, a power-on detection portion 176, a time determination portion 177, a termination preparation progress determination portion 178, a termination preparation stop portion 179, an initialization portion 180, and so on, all of which are shown in FIG. 12.

The power-off detection portion 171, the time measurement portion 172, the power shut off portion 175, the power-on detection portion 176, and the time determination portion 177 perform processing similar to the power-off detection portion 151, the time measurement portion 152, the power shut off portion 155, the power-on detection portion 156, and the time determination portion 157 (FIG. 2), respectively.

The termination preparation processing portion 173 performs the termination preparation processing in a manner similar to that of the termination preparation processing portion 153. The termination preparation processing by the termination preparation processing portion 173 is, however, stopped sometimes by the termination preparation stop portion 179 detailed later.

The fast snapshot processing portion 174 performs the fast snapshot processing in a manner similar to that of the fast snapshot processing portion 154. The fast snapshot processing by the fast snapshot processing portion 174 is not stopped.

The termination preparation progress determination portion 178 determines the progress of the termination preparation processing at a time when the power-on detection portion 156 has detected the ON-operation.

The termination preparation progress determination portion 178 refers to a completion value 6E. The completion value 6E shows the number of hardware modules which are ready to be turned off at a point in time when the ON-operation has been detected. The termination preparation progress determination portion 178 compares a threshold 6F and the completion value 6E; thereby determines the progress of the termination preparation processing.

The threshold 6F is the number of hardware modules which are caused, by the termination preparation processing portion 173, to be ready to be turned off during a period S51. The period S51 corresponds to a period S5 for the case where the equation "period H1=period S" is satisfied. The period S5 is a period from when the OFF-operation is performed to when the ON-operation is performed.

As with the first embodiment, the period H is a period of time from when the OFF-operation is performed to when the startup of the OS based on the fast snapshot data 6B is completed. The period H is expressed in the foregoing Equation (1).

The period S is a period of time from when the OFF-operation is performed to when the startup of the OS based on the standard snapshot data 6A, detailed later, is completed. The period S is expressed in the following equation.

$$S=S5+S3+S4 \qquad \text{Equation (6)}$$

The period S5 is the time necessary for the termination preparation processing. However, if the ON-operation is performed during the termination preparation processing, the termination preparation processing is sometimes stopped. In such a case, the period S5 is short. The period S3 is, as described above, the time required from when the startup of the BIOS starts to when the startup thereof finishes. The period S4 is, as described above, the time required from when the startup of the OS using the standard snapshot data 6A starts to when the startup thereof finishes.

As discussed above, the period S51 is the period S5 from when the OFF-operation is performed to when the ON-operation is performed, and is also the time for the case where the period H is equal to the period S, namely, the equation "H=S" is satisfied.

The right side of Equation (1) and the right side of Equation (6) are substituted into "H=S", and S51 is substituted into S5. Then, the following equation is expressed.

$$H1+H2+H3+H4=S51+S3+S4 \qquad \text{Equation (7)}$$

The period S51 is calculated from Equation (7).

$$S51=H1+H2+H3+H4-(S3+S4) \qquad \text{Equation (4)}$$

As discussed above, the startup processing of the BIOS in the startup processing of the OS based on the fast snapshot data 6B is the same as the startup processing of the BIOS in the startup processing of the OS based on the standard snapshot data 6A. Thus, the period S3 is equal to the period H3. The following equation is therefore satisfied.

$$S51=H1+H2+H4-S4 \qquad \text{Equation (5)}$$

The period H2 and the period H4 are determined according to the size of the fast snapshot data 6B as described earlier, and are almost constant. The period S4 is determined according to the size of the standard snapshot data 6A and a specific point in time as described earlier. The period S4 is almost constant.

It is assumed that the period H1 is fifteen seconds, the period H2 is two seconds, the period H3 is two seconds, the period H4 is seven seconds, and the period S4 is sixteen seconds. In such a case, if the period S5 is eight seconds, then each of the period H and the period S is twenty six seconds. The eight seconds correspond to the period S51.

When the period S5 is longer than the period S51 if only a little, for example, is two seconds longer than the period S51, then the period S is twenty eight seconds. Since the period H is twenty six seconds, the period S is longer than the period H. In short, the startup of the OS based on the fast snapshot data 6B is completed earlier than the startup of the OS based on the standard snapshot data 6A.

In contrast, when the period S5 is shorter than the period S51 if only a little, for example, is two seconds shorter than the period S51, then the period S is twenty four seconds. Since the period H is twenty six seconds, the period S is shorter than the period H. In short, the startup of the OS based on the standard snapshot data 6A is completed earlier than the startup of the OS based on the fast snapshot data 6B.

It is assumed that one hardware module is caused to be ready to be turned off per two seconds and the number of hardware modules which are ready to be turned off increases proportionally as the time elapses. In such a case, the threshold 6F, which shows the number of hardware modules ready to be turned off during the period S51, is four following the example provided above. Where the period S2 is longer than the period S21 by two seconds, the completion value 6E is five which is larger than the threshold 6F. Where the period S2 is shorter than the period S21 by two seconds, the completion value 6E is three which is smaller than the threshold 6F.

In light of the foregoing, where the period S5 is longer than the period S51, in other words, where the termination preparation processing proceeds so that the completion value 6E exceeds the threshold 6F, the startup of the OS based on the fast snapshot data 6B is completed earlier than the startup of the OS based on the standard snapshot data 6A.

Where the period S5 is shorter than the period S51, in other words, where the termination preparation processing does not proceed so that the completion value 6E exceeds the threshold 6F, the startup of the OS based on the standard snapshot data 6A is completed earlier than the startup of the OS based on the fast snapshot data 6B.

The threshold 6F and the period S51 are preferably calculated based on the numerical values obtained from the result of the termination preparation processing and the result of the startup of the image forming apparatus 1 performed previously. Alternatively, before the operation of the image forming apparatus 1 is started, the startup processing and the termination preparation processing may be performed, and then the threshold 6F and the period S51 may be calculated based on the numerical values obtained from the results thereof. Yet alternatively, the threshold 6F and the period S51 may be calculated every time the functions of the hardware or software are changed. Yet alternatively, the threshold 6F and the period S51 may be calculated in accordance with the operation state of the image forming apparatus 1 or the use period of the image forming apparatus 1.

Referring back to FIG. 12, where the termination preparation progress determination portion 178 determines that the progress of the termination preparation processing is below the predetermined standard, namely, that the completion value 6E is below the threshold 6F, the termination preparation stop portion 179 stops the termination preparation processing because the startup of the OS based on the standard snapshot data 6A is completed earlier than the startup of the OS based on the fast snapshot data 6B.

Where the termination preparation processing progresses to the predetermined standard exactly, the termination preparation processing may be continued or stopped.

The initialization portion 180 initializes the content of the RAM 10b. The initialization portion 180 does not initialize the fast snapshot processing because the snapshot progress determination portion 159 and the snapshot stop portion 160 are not provided.

Where the completion value 6E is equal to or larger than the threshold 6F, the termination preparation processing is continued to the end without being stopped, and then the fast snap processing is performed.

[Flow of the Entire Processing]

FIG. 13 is a flowchart depicting an example of the flow of the termination control processing. FIG. 14 is a flowchart depicting an example of the flow of the interrupt power supply processing.

The flow of the entire processing by the image forming apparatus 1 of the second embodiment is basically the same as that of the first embodiment, which is shown in FIG. 8.

However, the steps of the termination preparation processing of Step #16 are different from those in the first embodiment, and the steps are performed as depicted in FIG. 13.

As with the first embodiment, when the power-off detection portion 171 detects the OFF-operation (Step #751 of FIG. 13), the time measurement portion 172 starts counting the time of the off-period T1 (Step #752). Unless no ON-operation is detected (NO in Step #753), the termination preparation processing portion 173 starts the termination preparation processing (Step #754).

Where the ON-operation is detected (YES in Step #753) before the completion of the termination preparation processing (NO in Step #755), the interrupt power supply processing is started (Step #758). The steps of the interrupt power supply processing are shown in FIG. 14.

If the time determination portion 177 determines that the off-period T1 is longer than the reference period T2 (Step #781 and YES in Step #782 of FIG. 14), then the termination preparation progress determination portion 178 checks the progress of the termination preparation processing (completion value 6E) (Step #783).

If the progress of the termination preparation processing is above the predetermined standard (YES in Step #784), then the termination preparation processing is continued (Step #785), and thereafter, the fast snapshot processing portion 174 performs the fast snapshot processing (Step #786).

If the off-period T1 is shorter than the reference period T2 (NO in Step #782), or, alternatively, if the progress of the termination preparation processing is below the predetermined standard (NO in Step #784), then the termination preparation stop portion 179 stops the termination preparation processing (Step #788). In such a case, the fast snapshot processing is not performed.

After the stop of the termination preparation processing, or, after the completion of the fast snapshot processing, the initialization portion 161 initializes the data stored in the RAM 10b (Step #787).

Referring back to FIG. 13, where the termination preparation processing is completed (YES in Step #755), the fast snapshot processing portion 174 performs the fast snap processing (Step #756).

After the completion of the fast snapshot processing, the power shut off portion 175 turns off the power (Step #757).

According to the first and second embodiments, as compared to conventional technologies, it is possible to reduce the time required for the startup of the system of the image forming apparatus 1 for the case where the user performs the OFF-operation and soon after performs the ON-operation.

The foregoing embodiments may be modified as follows. Where the power-on detection portion 156 detects ON of the power and soon thereafter the power-off detection portion 151 detects OFF of the power, the fast snapshot processing may be omitted, or, the ongoing fast snapshot processing may be stopped. Then, the OS of the image forming apparatus 1 may be started by using the standard snapshot data 6A instead of using the fast snapshot data 6B. The repetition of the ON-operation and the OFF-operation for a short period of time is probably made in order that the user removes an error. It is thus desirable not to use the fast snapshot data 6B which might cause an error again.

To be specific, where additional time of the off-period T1 and an on-period T3 is shorter than predetermined time (T1+T3≤2 seconds), the fast snapshot processing may be omitted or stopped. The on-period T3 is a period of time from when the power-on detection portion 156 detects ON of the power to when the power-off detection portion 151 detects OFF of the power again. Alternatively, where each of the off-period T1 and the on-period T3 is equal to or shorter than the predetermined period (T1≤1 second, T2≤1.5 seconds, for example), the fast snapshot processing may be omitted or stopped.

Even when the standard snapshot data 6A is used, an error sometimes occurs. In light of this, normal startup may be performed without using the standard snapshot data 6A and the fast snapshot data 6B.

In the foregoing embodiments, a determination is made as to whether or not the off-period T1 is longer than the reference period T2. The determination may be omitted. In such a case, it may be determined whether or not the termination preparation processing is completed, or, alternatively, it may be determined whether or not the completion value 6E is above the threshold 6F.

In the foregoing embodiments, the data stored in the RAM 10b is obtained as the snapshot data. Instead of this, data stored in RAM of each of the hardware modules may be obtained as the snapshot data. The obtained snapshot data may be used to restore the state of the RAM of each of the hardware modules.

In the first embodiment, the snapshot progress determination portion 159 uses the saved data size 6B1, the unsaved data size 6B2, and the predetermined size 6C to determine the progress of the fast snapshot processing. In the second embodiment, the termination preparation progress determination portion 178 uses the completion value 6E and the threshold 6F to determine the progress of the termination preparation processing. Instead of these, however, the period S2 and the period S21 may be used to determine the progress of the fast snapshot processing. Alternatively, the period S5 and the period S51 may be used to determine the progress of the termination preparation processing.

The progress of the fast snapshot processing may be determined as follows. If the period S2 is longer than the period S21, then the snapshot progress determination portion 159 determines that the progress of the fast snapshot processing is above the predetermined standard. If the period S2 is shorter than the period S21, then the snapshot progress determination portion 159 determines that the progress of the fast snapshot processing is below the predetermined standard. The progress of the termination preparation processing may be determined as follows. If the period S5 is longer than the period S51, then the termination preparation progress determination portion 178 determines that the progress of the termination preparation processing is above the predetermined standard. If the period S5 is shorter than the period S51, then the termination preparation progress determination portion 178 determines that the progress of the termination preparation processing is below the predetermined standard.

The first and second embodiments may be combined together. For example, in the first embodiment, it may be determined whether or not the progress of the termination preparation processing is above the predetermined standard as described in the second embodiment, the termination preparation processing may be stopped depending on the progress thereof, and the startup of the OS based on the standard snapshot data 6A may be performed without performing the fast snapshot processing.

It is to be understood that the configurations of the image forming apparatus 1, the modules thereof, the content of the processing, the order of the processing, the structure of the data, and the like may be appropriately modified without departing from the spirit of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus comprising:
a non-volatile memory; and
a hardware processor configured to:
 execute a first obtaining process for obtaining first data before a shut-off command to turn off power is given, the first data being a predetermined part or a whole of data stored in the non-volatile memory at a predetermined point in time from when startup of a system starts to when the startup of the system finishes;
 execute a determination process for determining progress of predetermined processing in response to a connection command to turn on the power given during a period of time from when the shut-off command is given to when the system finishes;
 execute a second obtaining process for
  when the progress exceeds a predetermined standard, starting obtaining or continue obtaining second data, wherein the second data is data for restoring the apparatus at a time when the startup of the system finishes, and
  when the progress falls short of the predetermined standard, not starting obtaining or stop obtaining the second data, the second data being greater than the first data and being a predetermined part or a whole of data stored in the non-volatile memory at a point in time when the startup of the system finishes; and
 execute a startup process for, when the second obtaining process finishes obtaining the second data after the system finishes, starting up the system by using the second data, and to, when the second obtaining process fails to finish obtaining the second data after the system finishes, starting up the system by using the first data.

2. The image forming apparatus according to claim 1, wherein
the predetermined processing is to obtain the second data, and
the determination process is to determine, as the progress, progress in obtaining the second data.

3. The image forming apparatus according to claim 1, wherein the determination process includes determining, as the progress, a size of a part of the second data obtained in the second obtaining process at the time when the connection command is given.

4. The image forming apparatus according to claim 3, wherein the predetermined standard is a size of a part of the second data obtainable in the second obtaining process during a period of time from when the shut-off command is given to when the connection command is given in the case where a period of time from when the shut-off command is given to when the startup of the system with the first data finishes without shutting off the power is equal to a period of time from when the shut-off command is given to when the startup of the system with the second data finishes without shutting off the power.

5. The image forming apparatus according to claim 1, comprising
a plurality of execution portions configured to execute a job requested, wherein
the predetermined processing is to terminate the job in each of the execution portions after the shut off command is given, and
the determination process includes determining, as the progress, an amount of the execution portions terminated.

6. The image forming apparatus according to claim 1, comprising a measurement portion configured to count an elapsed time from when the shut-off command is given to when the connection command is given; wherein
when the elapsed time is shorter than a preset period of time, the second obtaining portion does not obtain the second data independently of the progress.

7. The image forming apparatus according to claim 1, wherein, when the connection command is given and then a re-shut-off command to again turn off the power is given, the second obtaining process does not start obtaining the second data or stops obtaining the second data independently of the progress.

8. A startup method by an image forming apparatus including a CPU and a non-volatile memory storing an executable program for causing the image forming apparatus to perform the startup method, the startup method comprising:
obtaining first data before a shut-off command to turn off power for the image forming apparatus is given, the first data being a predetermined part or a whole of data stored in the non-volatile memory at a predetermined point in time from when startup of a system starts to when the startup of the system finishes;
determining progress of predetermined processing in response to a connection command to turn on the power for the image forming apparatus given during a period of time from when the shut-off command is given to when the system finishes;
when the progress exceeds a predetermined standard, starting obtaining or continuing obtaining second data, and when the progress falls short of the predetermined standard, not starting obtaining or stopping obtaining the second data, the second data being greater than the first data and being a predetermined part or a whole of data stored in the non-volatile memory at a point in time when the startup of the system finishes, wherein the second data is data for restoring the apparatus at a time when the startup of the apparatus is completed; and
when obtaining the second data is finished after the system finishes, starting up the system by using the second data, and, when the second obtaining portion fails to finish obtaining the second data after the system finishes, starting up the system by using the first data.

9. A non-transitory recording medium storing a computer readable program used in an image forming apparatus, the image forming apparatus including a non-volatile memory and a startup portion for starting up a system by using, from among first data which is a predetermined part or a whole of data stored in the non-volatile memory at a predetermined point in time from when startup of a system starts to when the startup of the system finishes and which is obtained before a shut-off command to turn off power is given and second data which is greater than the first data and is a predetermined part or a whole of data stored in the non-volatile memory at a point in time when the startup of the system finishes, the second data when the second data is completely obtained, and by using the first data when the second data is not obtained, wherein the second data is data for restoring the apparatus at a time when the startup of the apparatus is completed, the computer readable program controlling the image forming apparatus to execute processing comprising:
determination processing for determining progress of predetermined processing in response to a connection command to turn on the power given during a period of time from when the shut-off command is given to when the system finishes; and
obtaining processing for, when the progress exceeds a predetermined standard, starting obtaining or continuing obtaining the second data, and, when the progress falls short of the predetermined standard, not starting obtaining or stopping obtaining the second data.

10. The non-transitory recording medium according to claim 9, wherein
the predetermined processing is to obtain the second data, and
the determination processing is to determine, as the progress, progress in obtaining the second data.

11. The non-transitory recording medium according to claim 9, wherein the determination processing is to determine, as the progress, a size of a part of the second data obtained in the second obtaining processing at the time when the connection command is given.

12. The non-transitory recording medium according to claim 11, wherein the predetermined standard is a size of a part of the second data obtainable during a period of time from when the shut-off command is given to when the connection command is given in the case where a period of time from when the shut-off command is given to when the startup of the system with the first data finishes without shutting off the power is equal to a period of time from when the shut-off command is given to when the startup of the system with the second data finishes without shutting off the power.

13. The non-transitory recording medium according to claim 9, wherein the image forming apparatus includes a plurality of execution portions configured to execute a job requested, the predetermined processing is to terminate the job in each of the execution portions after the shut off command is given, and the determination processing is to determine, as the progress, an amount of execution portions, of the execution portions, having terminated the job.

14. The non-transitory recording medium according to claim 9, wherein the image forming apparatus is controlled to perform measurement processing for counting an elapsed time from when the shut-off command is given to when the connection command is given, when the elapsed time is shorter than a preset period of time, the second obtaining processing is not performed independently of the progress.

15. The non-transitory recording medium according to claim 9, wherein, when the connection command is given and then a re-shut-off command to again turn off the power is given, the image forming apparatus is controlled to not perform the second obtaining processing or to stop the second obtaining processing independently of the progress.

* * * * *